United States Patent [19]
Stegbauer et al.

[11] Patent Number: 5,218,456
[45] Date of Patent: Jun. 8, 1993

[54] DISK BANDWIDTH ALLOCATIONS TO PRIORITIZE DISK REQUESTS

[75] Inventors: Randall J. Stegbauer, Ontario; Anthony M. Federico, Webster; Ronald A. Ippolito, Rochester; Christopher Comparetta, Pittsford; Colleen R. Enzien, Penfield; Kitty Sathi, Pittsford; Ernest L. Legg, Fairport, all of N.Y.

[73] Assignee: Xerox Corporation, Stamford, Conn.

[21] Appl. No.: 733,491

[22] Filed: Jul. 22, 1991

[51] Int. Cl.$^5$ .............................................. H04N 1/21
[52] U.S. Cl. ................................... 358/404; 358/444; 358/296
[58] Field of Search ............... 358/296, 404, 444, 468; 355/202

[56] References Cited

U.S. PATENT DOCUMENTS

| | | | |
|---|---|---|---|
| 4,332,463 | 6/1982 | Firth et al. | 355/202 X |
| 4,564,864 | 1/1986 | Maeshima | 358/444 |
| 4,719,516 | 1/1988 | Nagashima | 358/444 X |
| 4,748,513 | 5/1988 | Yamada | 358/444 |
| 5,021,892 | 6/1991 | Kita et al. | 358/468 |
| 5,025,483 | 6/1991 | Dinan et al. | 358/404 X |
| 5,087,979 | 2/1992 | Schaertel | 358/444 X |

Primary Examiner—Benjamin R. Fuller
Assistant Examiner—Eric Frahn
Attorney, Agent, or Firm—Ronald F. Chapuran

[57] ABSTRACT

An electronic image processing apparatus having image processing resources including a controller for directing the operation of the image processing resources, the controller including a disk memory, the method of controlling mass memory device bandwidth access during an access time window including guaranteeing access to the memory for predetermined time periods for a first set of image processing resources during each access time window, a second set of image processing resources having access subordinate to the first set of image processing resources, maintaining a record of mass memory device access for the first set of image processing resources during each access time window, receiving a memory access request from the first set of image processing resources, determining that said resource utilization does not exceed the predetermined time period, and allowing current access to the mass memory device by the image processing resource. The second set of image processing resources achieves access upon determination that none of the first set of resources is requesting access or upon determination that each of the first set of resources has exceeded the predetermined time period.

12 Claims, 9 Drawing Sheets

DISK BANDWIDTH ALLOCATIONS TO PRIORITIZE DISK REQUESTS

BACKGROUND OF THE INVENTION

The invention relates to disk access in scanner/-printer control, and more particularly, to a technique for allocating disk bandwidth (BW) in order to prioritized disk access.

As electronic imaging machines such as copiers and printers become more complex and versatile in operation with greater speed and copy output required, there is a greater demand for higher performance and expectations from limited resources. A suitable control must be able to not only coordinate the operation of the various components of the machine such as the scanner and the printer but must also be able to schedule and allocate memory to provide the most efficient and productive operation of these components. In particular, in imaging machines there is often the need for various components of the machine such as the scanner or printer to have access to a mass memory device such as a disk memory. The disk capacity, often given as megabytes per second is a boundary that prevents unlimited access to the disk. Yet, many resources and components must often complete for disk access.

In the prior art, simple priority schemes such as a numerical round robin procedure are ineffective because they do not take into account the non uniform needs and capacity requirements of the differing resources and components requiring disk access with non-deterministic arrival rates. Some real time resources such as the printer or scanner need to be guaranteed a minimum amount of available disk bandwidth in order that data buffers can be emptied in time to be refilled. Other resources may simply attempt to access the disk simultaneously. A difficulty with the prior art machine systems is the lack of capability or control organization to meet these demands. It would be desirable to be able to provide a scheme to accurately limit the bandwidth allowed to some clients and guarantee the bandwidth to others.

It is an object, therefore, of the present invention to be able to coordinate simultaneous access to limited memory by multiple resources. Another object of the present invention is to guarantee real time resources a minimum amount of available disk bandwidth. Another object of the present invention is to allocate disk bandwidth between resources with realtime disk constraints and non-realtime performance requirements. Other advantages of the present invention will become apparent as the following description proceeds, and the features characterizing the invention will be pointed out with particularity in the claims annexed to and forming a part of this specification.

SUMMARY OF THE INVENTION

The method of controlling mass memory device bandwidth access during an access time window including guaranteeing access to the memory for predetermined time periods for a first set of image processing resources during each access time window, a second set of image processing resources having access subordinate to the first set of image processing resources, maintaining a record of mass memory device access for the first set of image processing resources during each access time window, receiving a memory access request from the first set of image processing resources, determining that said resource utilization does not exceed the predetermined time period, and allowing current access to the mass memory device by the image processing resource. The second set of image processing resources achieves access upon determination that none of the first set of resources is requesting access or upon determination that each of the first set of resources has exceeded the predetermined time period.

For a better understanding of the present invention, reference may be had to the accompanying drawings wherein the same reference numerals have been applied to like parts and wherein:

DETAILED DESCRIPTION OF THE DRAWINGS

Figure 5A:
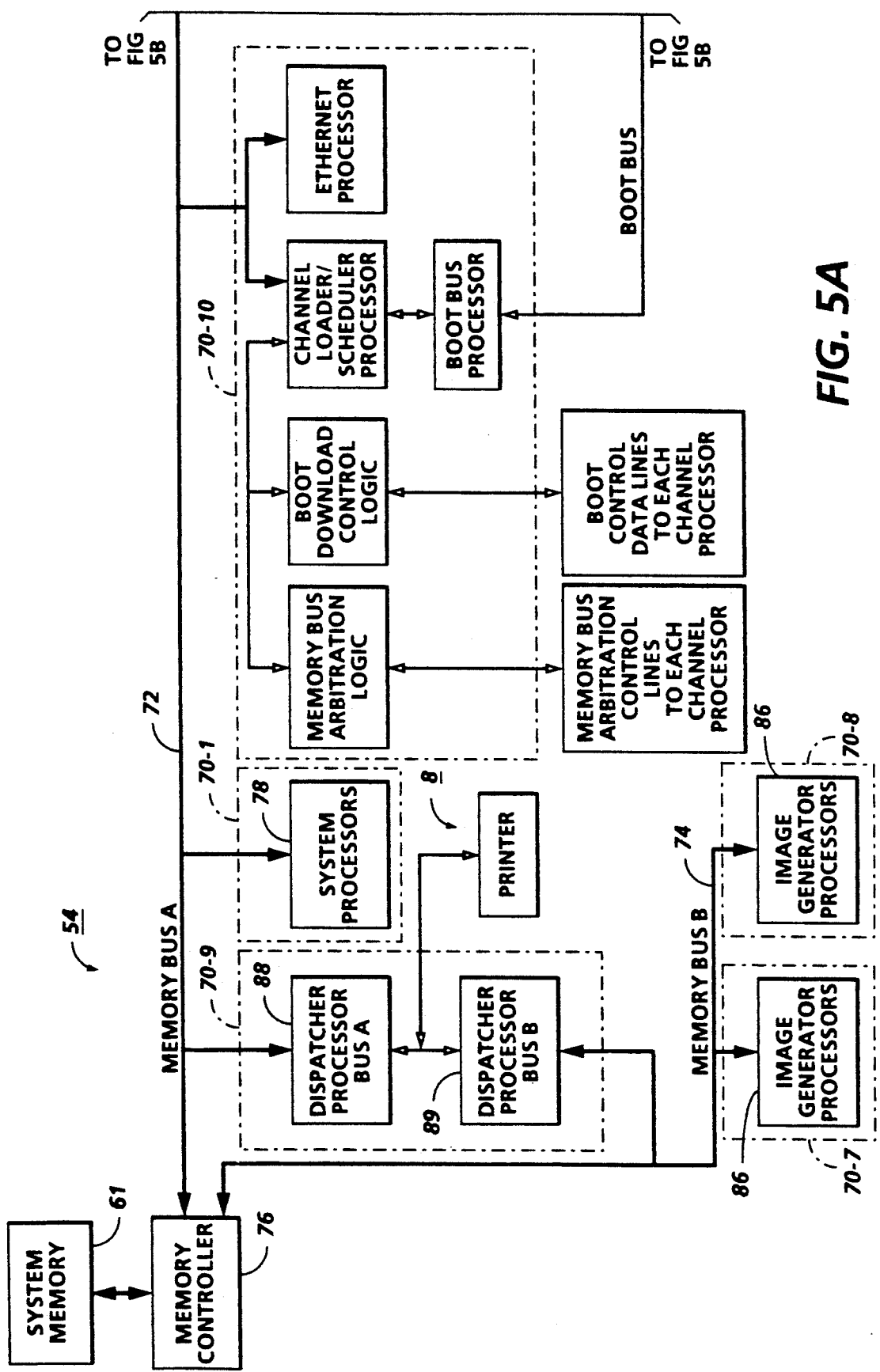
Figure 5B:
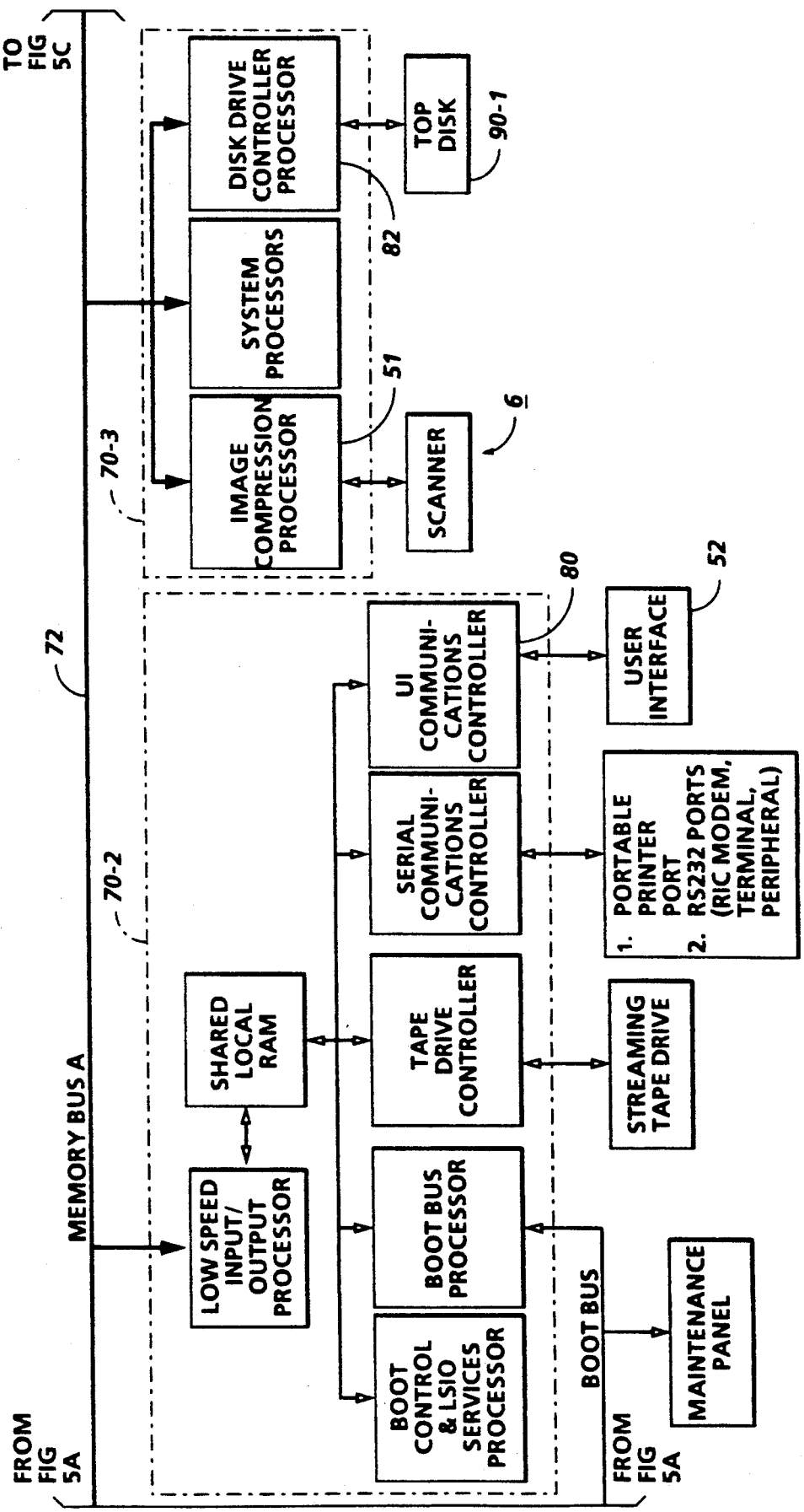
Figure 5C:
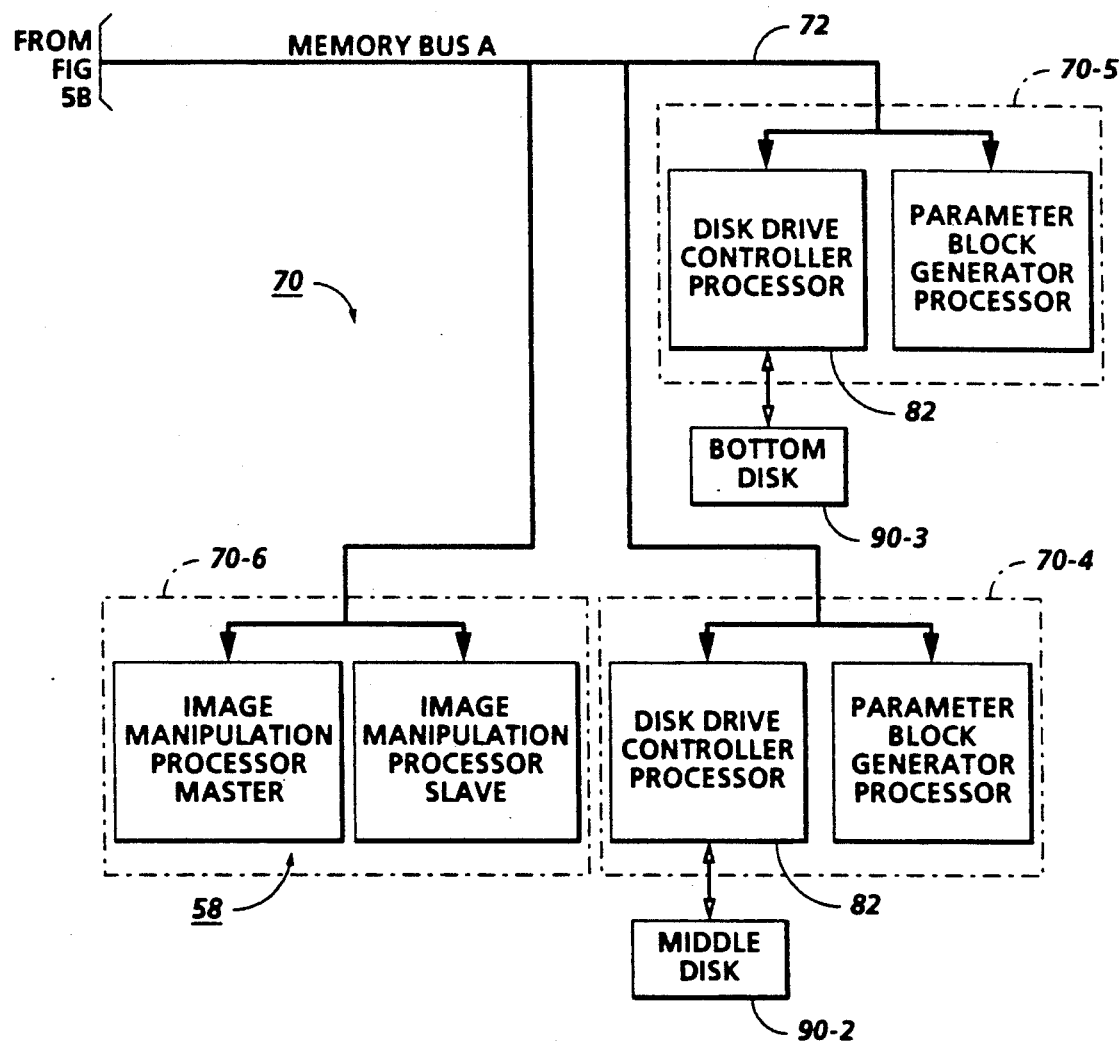
Figure 6:
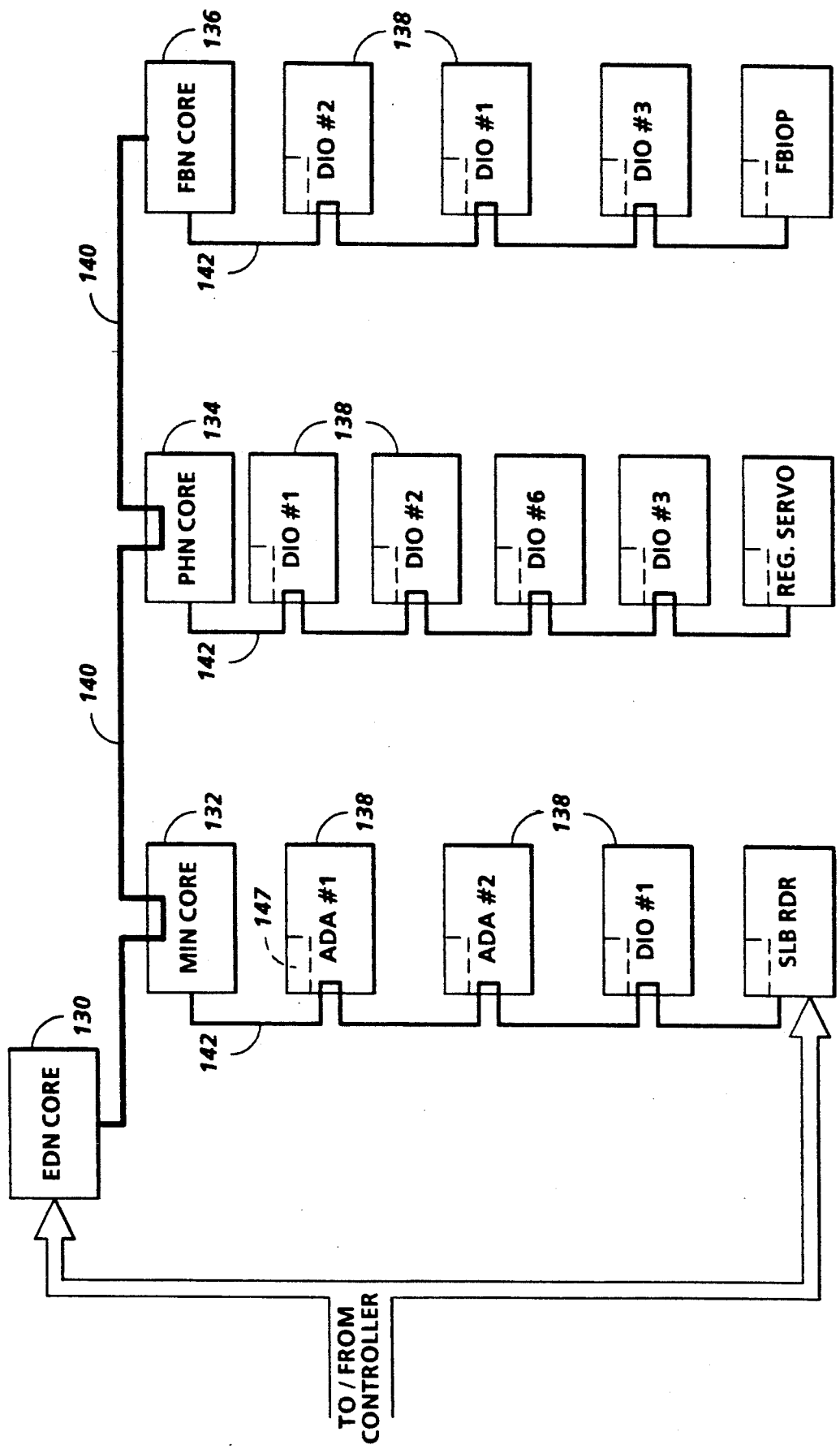
Figure 7:
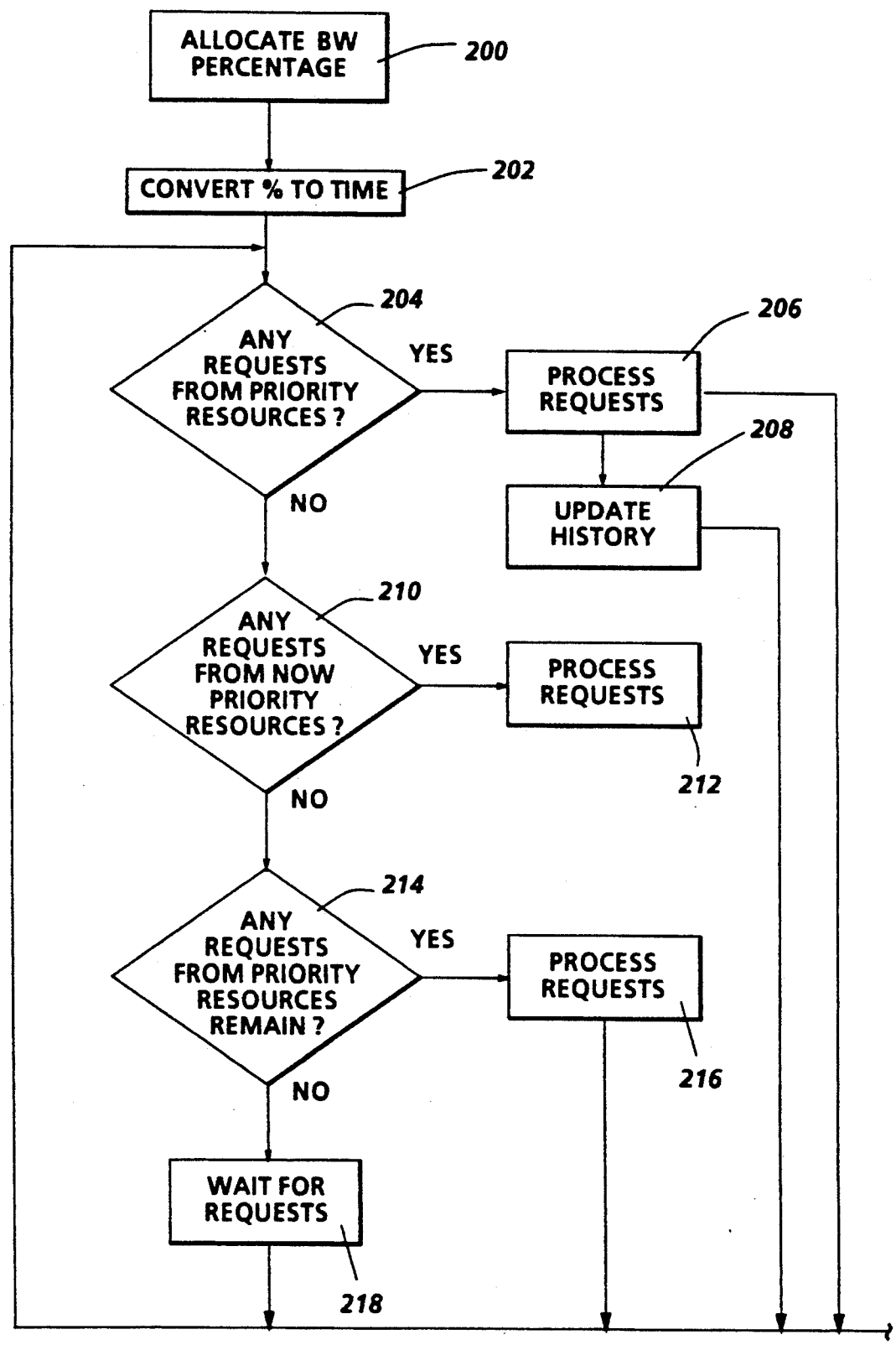

FIGS. 5A, 5B, and 5C comprise a schematic block diagram showing the major parts of the system control section;

FIG. 6 is a block diagram depicting the Operating System, with Printed Wiring Boards and shared line connections; and FIGS. 7 illustrates a flow chart of the bandwidth allocation in accordance with the present invention.

DETAILED DESCRIPTION OF THE PREFERRED EMBODIMENT

Figure 1:
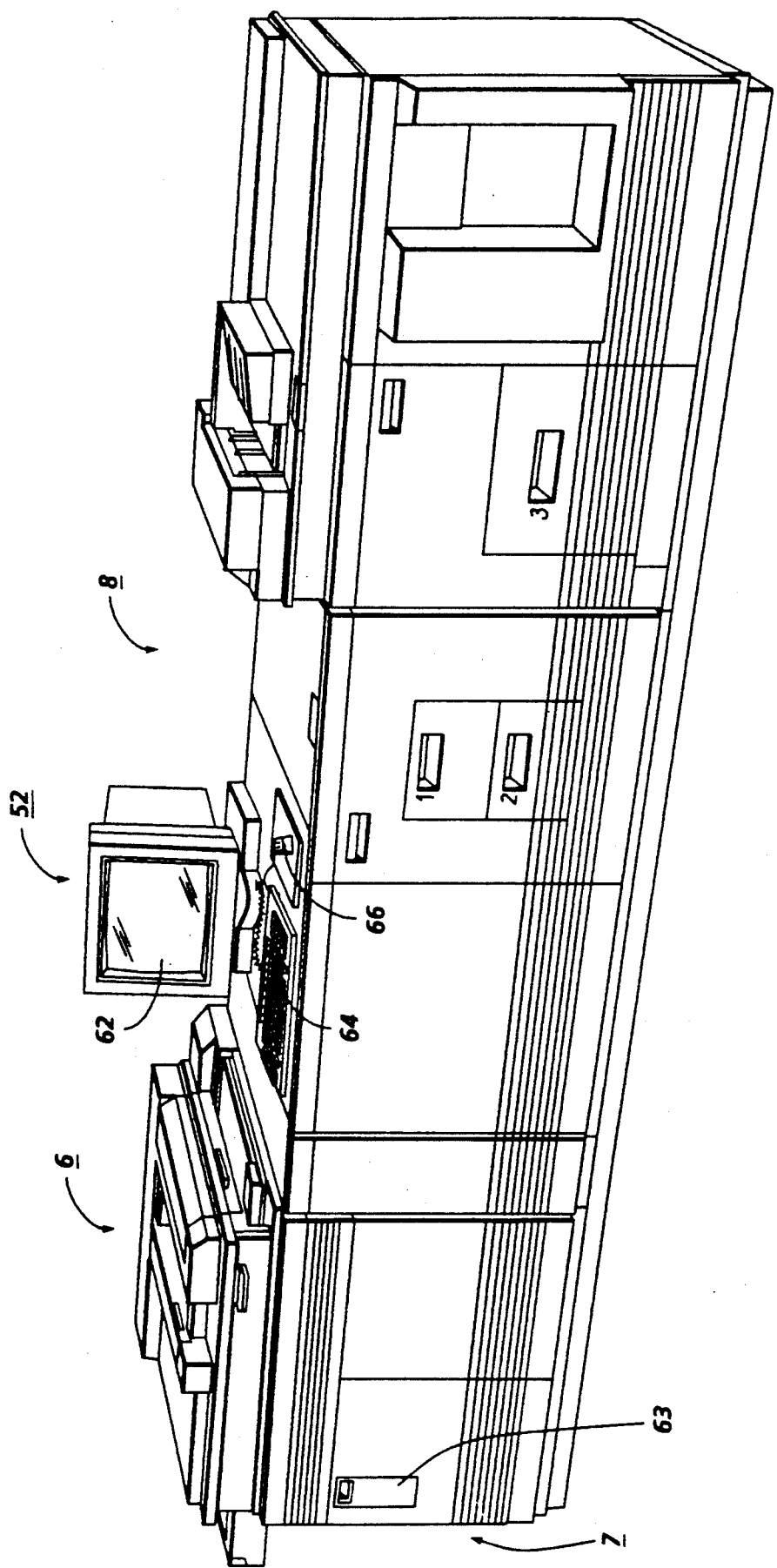
FIG. 1 is a view depicting an electronic printing system with the job supplement of the present invention allowing building of print jobs from diverse inputs or in response to special programming instructions.
Figure 2:
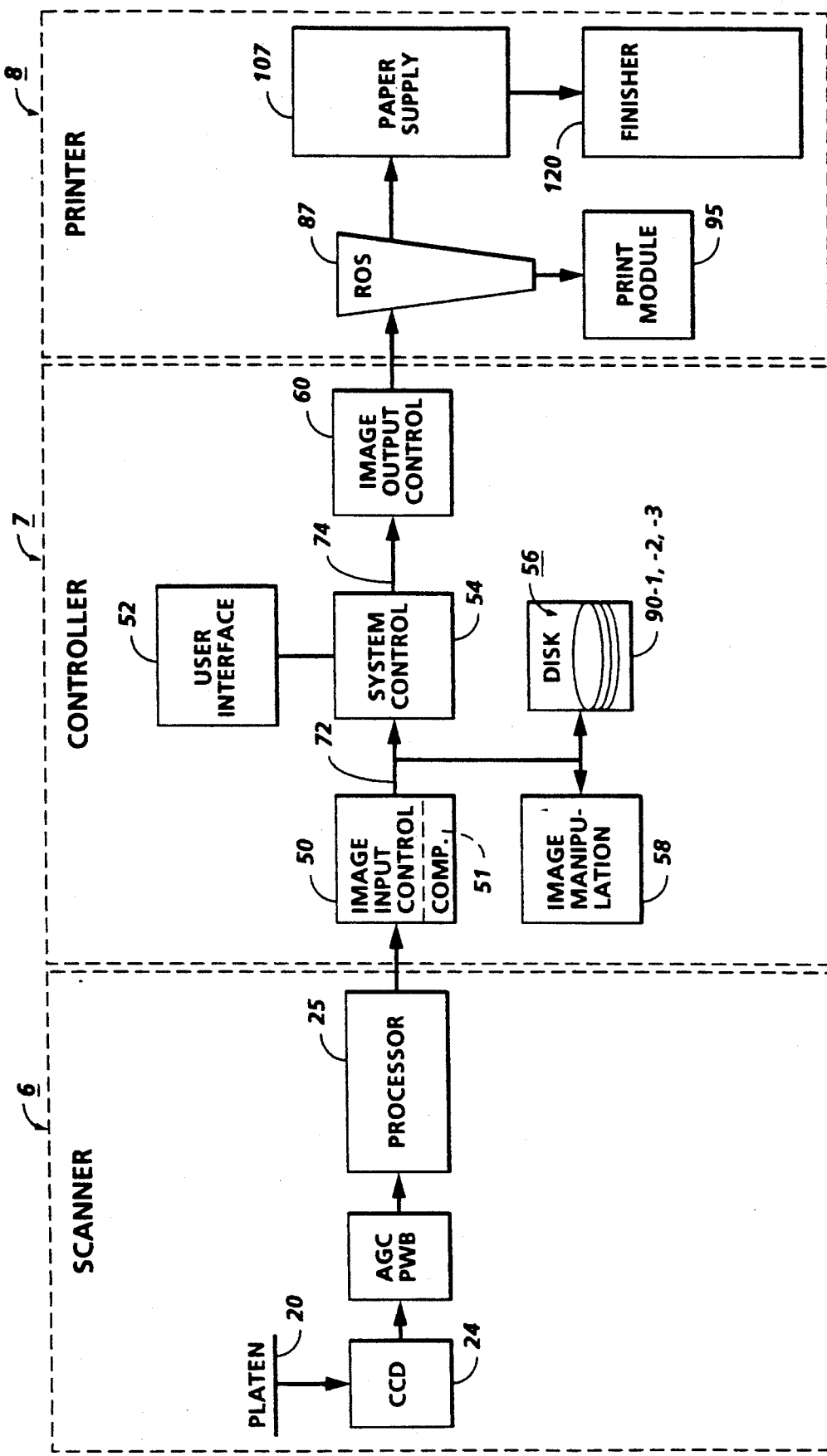
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
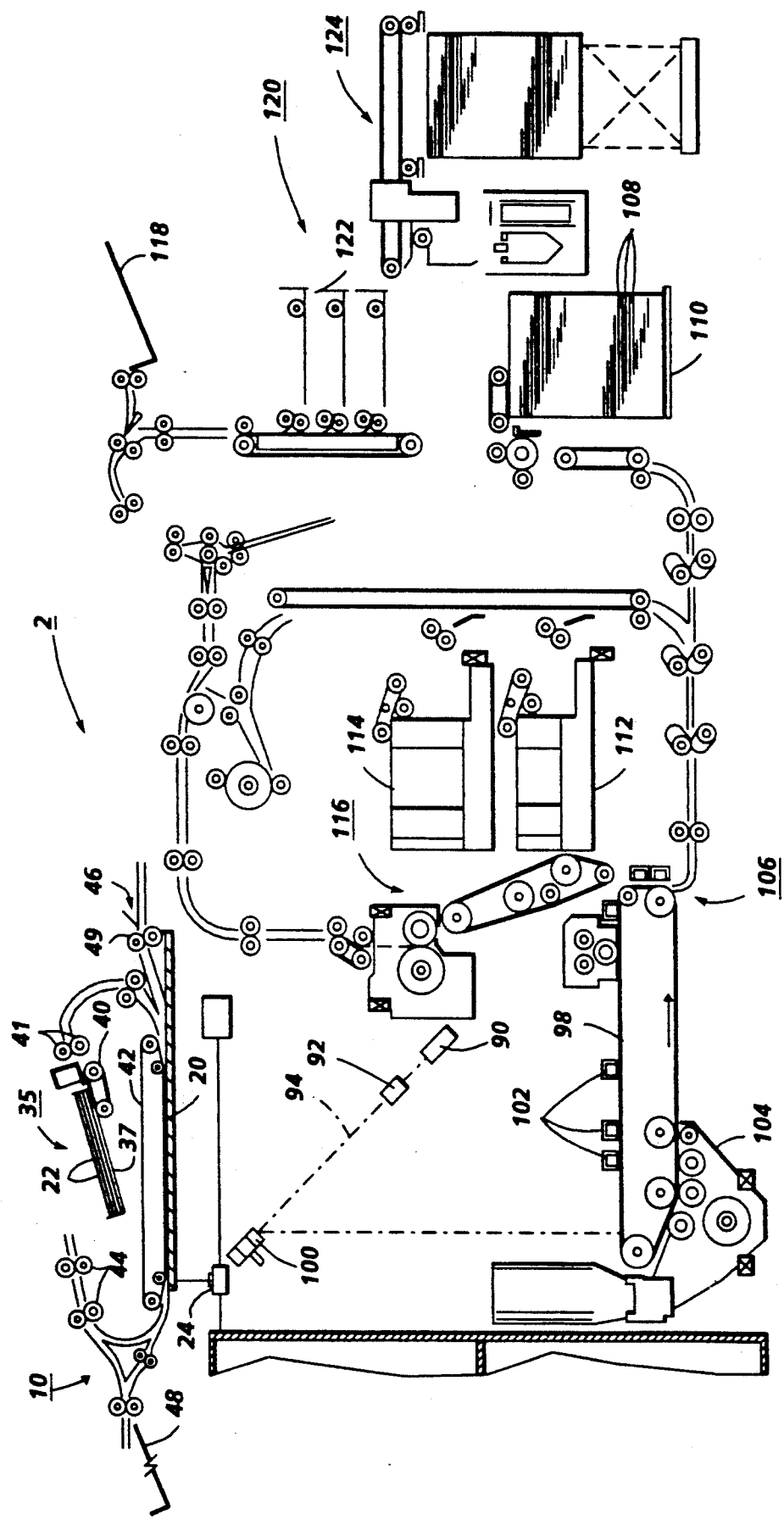
FIG. 3 is a plan view illustrating the principal mechanical components of the printing system shown in FIG. 1.
Figure 4:
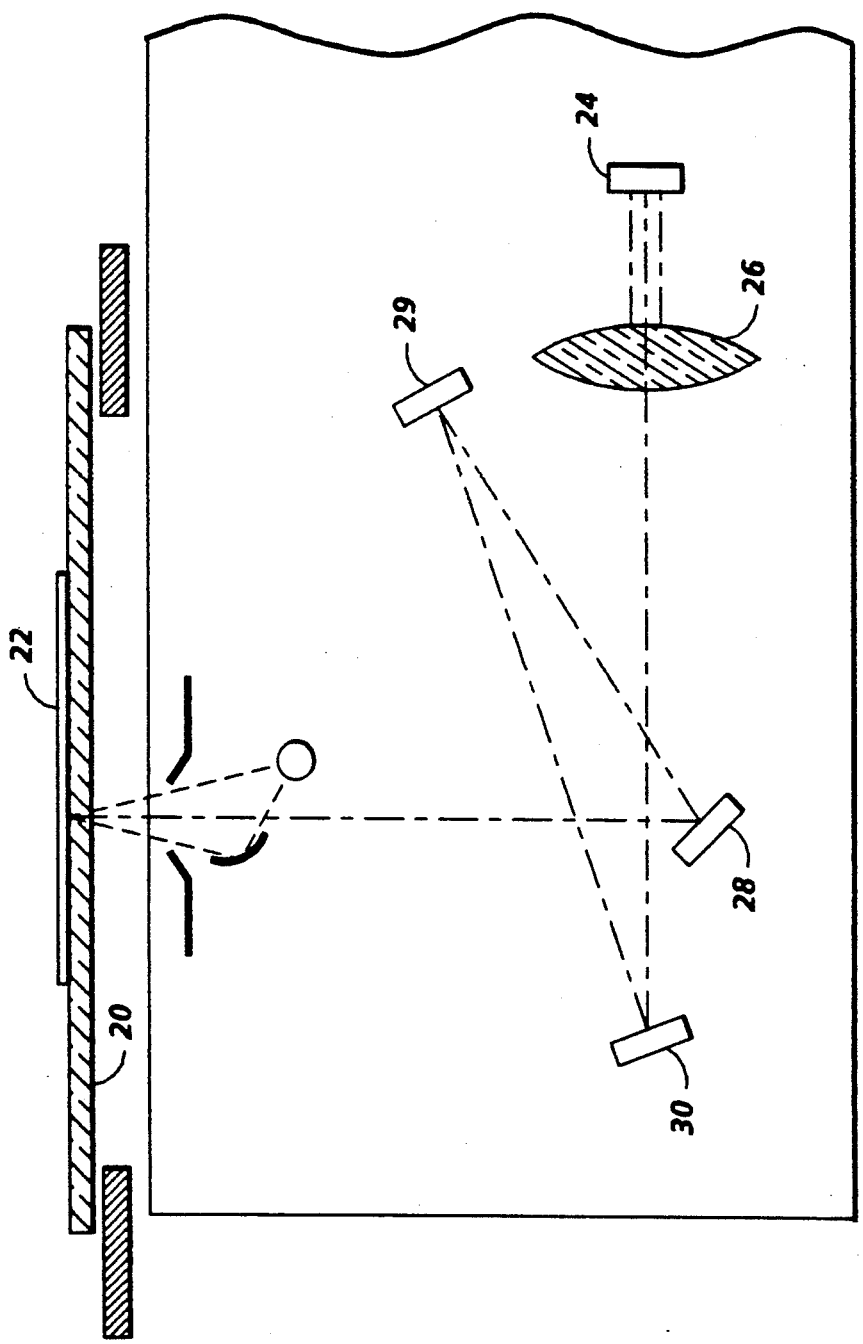
FIG. 4 is a schematic view showing certain construction details of the document scanner.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58 and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

In accordance with the present invention, with reference to the flow chart, FIG. 7, initially there is an allocation of bandwidth percentage for various priority resources of the machine as shown at 200. For example, the scanner operation could be allocated 12% of the available bandwidth, the printer allocated 44%, and non-volatile memory allocated 10% of the available bandwidth. Some operations or tasks such as billing, diagnostics, and various management and background control procedures are non priority resources and have no allocation. Instead these non priority resources are left to obtain access when none of the priority resources such as the scanner, printer or non-volatile memory have access requirements or all the priority resources have exceeded the allocated percentage. It should be noted that this allocated percentage is normally given over a window in time, for example two seconds, after which the guaranteed times would be renewed for each of the priority resources.

Preferably, the guaranteed access times to those resources that are guaranteed an access time is pre-determined based upon an expected needs requirement of the various resources of the machine. On the other hand, this determination could be an automatic determination that is adjusted based upon previous machine usage and demands for bandwidth by the various priority resources. There could also be variable percentages based upon a specific configuration of the machine or locations with expectations of greater or less scanning requirements or greater or less printing requirements, as an example. In short, there are some resources of the machine principally the scanner, non-volatile memory, and the printer with pre-determined allocated bandwidth percentages. These resources are called priority resources. Other resources that have no guaranteed access are non-priority resources.

Again, with reference to FIG. 7, as illustrated at 202, the guaranteed access percentages are converted to actual time. This actual access time will, of course, depend upon the frequency of renewal of the access window. As requests for bandwidth access are monitored, as shown at 204, initially, the determination is made whether or not the requesting resource has guaranteed access or no guaranteed access to bandwidth. That is, whether or not it is a priority resource. If the answer is yes, there is guaranteed access to the particular resource requesting access. Then the request is processed at 206, and the history of usage or cumulated time of access updated at 208. It is assumed, of course, that the total time requested during the current request will not cause the requesting resource to exceed its allocation. This current access time is added to the total access time already accumulated by the requesting resource to be used as the reference for additional requests by the given resource during that particular access window.

If all the priority resources requesting access have already exceeded allocated access time or the requested amount of time will exceed the allocated access time, for all the priority resources, then requests from non priority resources are monitored. The non priority resources are also monitored if no priority resource is requesting access. A decision is made as shown at 210 whether or not there are requests from non priority resources with no guaranteed access. If there are, then the requests are processed as shown at 212. In other words, if none of the resources with guaranteed access have a current valid request for bandwidth access, then the request of the non-guaranteed resource can be honored and access granted. Finally, if there are no requests from a non-priority resource, then requests from priority resources are again monitored as illustrated at 214. It should be understood that decision block 214 is relevant only if all the priority resources have already exceeded their allocated time within a given time window. Once a new time window is available, decision block 204 is the initial monitor of requests. If there are requests from priority resources still remaining within a given time window, then requests are processed as shown at 216. If there are no requests, then there is a period of waiting for requests as illustrated at 218. This period remains in effect until a new time window occurs. When the new time window occurs, the system returns to decision block 204 as discussed above.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. A method of scheduling mass memory device access in an electronic image processing apparatus having image processing resources including a controller for directing operation of the image processing resources, the controller including a mass memory device, the image processing resources including a first set of image processing resources having predetermined memory device access allocations and a second set of image processing resources having non-priority memory device access, comprising the steps of:

maintaining a record of mass memory device access for the first set of image processing resources, receiving a memory device access request from one of the first set of image processing resources, determining the memory device access of said one of the first set of image processing resources exceeds mass memory device access allocation, checking demands for access from remaining first and second set resources and confirming that access from remaining first and second resources is not requested, and allowing current access to the mass memory device by said one of the first set of image processing resources.

2. A method of controlling mass memory access during an access time window in an electronic image processing apparatus having image processing resources including a controller for directing operation of the image processing resources, the image processing resources including a first set of image processing resources and a second set of image processing resources, the controller including a mass memory, the method comprising the steps of:

guaranteeing access to the memory for predetermined time periods for each of the first set of image processing resources during each access time window, the second set of image processing resources having access to the memory subordinate to the first set of image processing resources, maintaining a record of mass memory device access time for the first set of image processing resources during each access time window, receiving a memory access request from a given image processing resource from the first set of image processing resources, determining that the time period for access of said given image processing resource does not exceed the predetermined time period for said given image processing resource, and allowing current access to the mass memory device by said given image processing resource.

3. The method of claim 2 including a step of adding current time period for access time to the record of access time for said image processing resource.

4. The method of claim 2 including the step of allowing disk access to one of the second set of image processing resources upon determination that none of the first set of resources is requesting access.

5. The method of claim 2 including the step of allowing disk access to one of the second set of image processing resources upon determination that each of the first set of image processing resources has exceeded the predetermined time period for access.

6. A method of scheduling mass memory device access in an electronic image processing apparatus having image processing resources including a first set of resources including an electronic scanner and an electronic printer and a second set of resources for forming an image, a controller for directing operation of the image processing resources, the controller including a mass memory device for storing data to be printed, the method comprising the steps of:

allocating the first set of resources with predetermined guaranteed access time periods to the mass memory device, allocating the second set of resources with no guaranteed access time period to the mass memory device, the second set of resources having access upon the time period of access of the first set of resources exceeding said predetermined guaranteed access time periods, and monitoring the first set of resources to determine whether the time period of one of the first set of resources exceeds predetermined guaranteed access time periods.

7. The method of claim 6 including the step of maintaining a mass memory device bandwidth allocation table.

8. The method of claim 6 including the step of maintaining a log of mass memory device usage of each processing resource over a period of time.

9. The method of claim 6 including the step of inhibiting mass memory device access by a given processing resource if bandwidth allocation for given processing resource exceeds a threshold level.

10. The method of claim 6 wherein the mass memory device bandwidth allocation is a bandwidth percentage converted to time.

11. A method of controlling mass memory device bandwidth access during an access time window in an electronic image processing apparatus having image processing resources including a controller for directing operation of the image processing resources, the controller including a disk memory, the method comprising the steps of: guaranteeing access to the memory for predetermined time periods for a first set of image processing resources during each access time window, a second set of image processing resources having access subordinate to the first set of image processing resources, maintaining a record of mass memory device access for the first set of image processing resources during each access time window, receiving a memory access request from an image processing resource from the first set of image processing resources, determining that the time period of access of said resource does not exceed a predetermined time period, and allowing current access to the mass memory device by said image processing resource.

12. The method of claim 11 wherein the second set of image processing resources achieves access upon determination that none of the first set of images processing resources is requesting access or upon determination that the time period of access of each of the first set of image processing resources has exceeded the predetermined time periods.

* * * * *